US011873609B2

(12) United States Patent
Brinkman et al.

(10) Patent No.: US 11,873,609 B2
(45) Date of Patent: Jan. 16, 2024

(54) VEHICLE BARRIER GATE ARM HAVING ANTI-ROLL END CAP

(71) Applicants: Jonathan Brinkman, Miami, FL (US); Randy Perez, Miami, FL (US)

(72) Inventors: Jonathan Brinkman, Miami, FL (US); Randy Perez, Miami, FL (US)

( * ) Notice: Subject to any disclaimer, the term of this patent is extended or adjusted under 35 U.S.C. 154(b) by 0 days.

(21) Appl. No.: 17/822,779

(22) Filed: Aug. 27, 2022

(65) Prior Publication Data

US 2023/0071614 A1 Mar. 9, 2023

Related U.S. Application Data

(60) Provisional application No. 63/237,767, filed on Aug. 27, 2021.

(51) Int. Cl.

| | |
|---|---|
| ***E06B 11/02*** | (2006.01) |
| ***E01F 13/06*** | (2006.01) |
| ***F21S 4/28*** | (2016.01) |
| *F21W 111/00* | (2006.01) |
| *F21Y 115/10* | (2016.01) |

(52) U.S. Cl.

CPC ............ *E01F 13/06* (2013.01); *E06B 11/022* (2013.01); *F21S 4/28* (2016.01); *F21W 2111/00* (2013.01); *F21Y 2115/10* (2016.08)

(58) Field of Classification Search

CPC ........... E01F 13/06; E06B 11/022; F21S 4/28; F21W 2111/00; F21Y 2115/10; F21V 33/0076

USPC .............................................................. 49/49

See application file for complete search history.

(56) References Cited

U.S. PATENT DOCUMENTS

| | | | | |
|---|---|---|---|---|
| 6,487,818 B1 * | 12/2002 | Hamann | E01F 9/20 | 49/13 |
| 6,618,993 B2 * | 9/2003 | Burke | E01F 13/06 | 49/49 |
| 6,997,417 B2 * | 2/2006 | Zarkades | B61L 29/04 | 246/127 |
| 7,258,461 B1 * | 8/2007 | Izardel | E01F 13/04 | 362/183 |
| 8,011,797 B2 * | 9/2011 | Rihl | E01F 13/06 | 362/249.02 |
| D707,851 S * | 6/2014 | Pikman | D25/48.5 | |
| 8,845,125 B1 * | 9/2014 | Lumsden | B61L 29/04 | 362/249.02 |

(Continued)

FOREIGN PATENT DOCUMENTS

| | | | |
|---|---|---|---|
| CA | 3139654 A1 * | 1/2021 | B60Q 1/0035 |
| CN | 111396792 A * | 7/2020 | |

*Primary Examiner* — Jerry E Redman

(74) *Attorney, Agent, or Firm* — Allen F. Bennett; Bennett Intellectual Property

(57) ABSTRACT

A vehicle barrier gate arm has an anti-roll end cap which prevents the gate arm from rolling when it has become detached from its gate operator. The end cap comprises a distal outer panel and three or more protrusions positioned radially equidistant along the periphery of the distal outer panel. The protrusions extend outward from the distal outer panel perpendicular to the gate arm. The protrusions may form a square, triangle, trapezoid, or cross and may taper inward in a proximal direction or may meet the outer cuff at a sharp angle. Furthermore, an outer and inner cuff form a friction fit with the end of a gate arm to removeable attach the end cap to the distal end of the gate arm.

20 Claims, 8 Drawing Sheets

(56) References Cited

U.S. PATENT DOCUMENTS

| | | | | |
|---|---|---|---|---|
| 9,157,200 | B2 * | 10/2015 | Lumsden | F21S 4/20 |
| 9,228,708 | B2 * | 1/2016 | Dings | F21S 4/28 |
| 9,273,435 | B2 * | 3/2016 | Lumsden | E01F 13/06 |
| 10,364,950 | B2 * | 7/2019 | Pikman | F21V 33/006 |
| 2008/0038055 | A1 * | 2/2008 | Jankovsky | E01F 13/048<br>404/6 |
| 2008/0240854 | A1 * | 10/2008 | Binns | E06B 11/08<br>49/46 |
| 2018/0266662 | A1 * | 9/2018 | Yifan | F21V 17/06 |
| 2020/0386393 | A1 * | 12/2020 | Dieser | A01G 9/249 |
| 2023/0071614 | A1 * | 3/2023 | Brinkman | F21V 33/0076 |

* cited by examiner

VEHICLE BARRIER GATE ARM HAVING ANTI-ROLL END CAP

CROSS-REFERENCE TO RELATED APPLICATIONS

This application claims priority to U.S. Provisional Application Ser. No. 63/237,767 filed on Aug. 27, 2021, the contents of which are hereby incorporated in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of the Invention

The present invention relates to a vehicle barrier gate arm having an anti-roll end cap. More particularly, the invention relates to an anti-roll end cap for a vehicle barrier gate arm having transverse protrusions which prevent the gate arm from rolling when it is detached from its gate operator.

Description of the Related Art

Movable barriers, such as pivoting gate arms, have long been used to control access to parking lots, parking decks, residential subdivisions and other areas. Typically, a barrier includes a gate arm supported by a gate operator on one side of a pathway such as a vehicle roadway and extending across substantially all of the pathway. These barrier gate arms may pivot upward, pivot horizontally, or retract. Unfortunately, these various gate arms are not always easily visible to the operators of vehicles. Nighttime, fog, distractions, misunderstandings of the gate arm itself and driver error all can result in an accidental collision between a vehicle and a gate arm.

A variety of devices and methods have been utilized to minimize or prevent accidental collisions between the vehicle and a barrier gate arm. Reflective tape, bright colors, sound accompanying the pivoting of the gate arm and lighting have all been used to attract a driver's attention to prevent mishap. Of these, light systems are probably the most common accessory to a gate arm. The addition of light systems to barrier gate arms has significantly reduced the number of accidental collisions during nighttime.

Despite these efforts to improve visibility of a gate arm, there will always be accidental collisions between vehicles and gate arms. In addition, severe storms such as hurricanes, falling trees and other natural disasters can damage gate arm devices. Thus, efforts have also been made to minimize the damage done when a gate arm is struck by an automobile or other object. A common safety feature of vehicle barrier gate arms is a breakaway bracket designed to easily detach the gate arm from its gate operator when sufficient force is applied. This feature often prevents damage to the gate operator and vehicle, and only the gate arm itself is damaged. Unfortunately, a dislodged gate arm often rolls a considerable distance, causing further damage to itself and/or damaging objects it rolls into.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

In view of the foregoing, it is desirable to provide systems and devices for minimizing damage caused by a dislodged gate arm. It is also desirable to provide systems and devices for preventing a dislodged gate arm from rolling a considerable distance.

BRIEF SUMMARY OF THE INVENTION

Disclosed is a vehicle barrier gate arm having an anti-roll end cap. Typically, the end cap is attached to an elongate gate arm defined by an exterior wall, an elongate channel extending longitudinally along the length on the gate arm, and an LED light strip retained within the elongate channel. A gate operator is pivotally coupled to a proximal end of the gate arm. The gate operator has a control system, a power supply, and an actuator to selectively pivot the gate arm between a horizontal position and a vertical position. The end cap has a distal end and a proximal end and is attached to a distal end of the gate arm. The end cap has a distal outer panel and three or more protrusions positioned equidistantly along the periphery of the distal outer panel and extended outward perpendicular to the gate arm.

In one embodiment, the end cap comprises four protrusions, a substantially square outer panel, a cylindrical outer cuff extending in a proximal direction, and an inner cuff also extending in a proximal direction. The four protrusions have rounded ends and taper inward in a proximal direction toward a proximal end of the cylindrical outer cuff. The inside wall of the cylindrical outer cuff contains two tabs tapering in the proximal direction aligned with two rectangular indentations on the inner cuff, and the tabs and indentations align with the elongate channel in the gate arm. The end cap is removably attached to the gate arm by a friction fit between the gate arm and the cylindrical outer cuff and the inner cuff. The end cap also contains two through holes extending through the distal outer panel, and the four protrusions have an internal honeycomb structure.

In another embodiment, the end cap comprises four protrusions, a substantially square outer panel, where the four protrusions have sharp ends and meet the cylindrical outer cuff at a right angle.

In another embodiment, the end cap comprises three protrusions, and a substantially triangular outer panel.

In another embodiment, the end cap comprises four protrusions, and a substantially cross-shaped distal outer panel.

In another embodiment, the end cap comprises four protrusions, and a substantially trapezoidal distal outer panel.

In another embodiment, the end cap is composed of florescent material.

In another embodiment, the end cap is composed of transparent material, and contains an LED light.

In another embodiment, the end cap contains an LED light routed through a clip in the end cap that is a distal portion of the LED strip retained within the elongate channel.

In another embodiment, the end cap contains a flag.

In another embodiment, the end cap comprises a cylindrical foam cylinder extending in a proximal direction and is configured to extend into and provide a friction fit into the distal end of the gate arm.

In another embodiment, the end cap comprises a screw positioned in the center of the outer panel which extends in a proximal direction and is engaged with a biased toggle bolt with two or more wings and a brake pad on each wing; and wherein when the screw is twisted the two or more wings extend and the brake pads impinge on an inner wall of the distal end of the gate arm.

It is therefore an object of the present invention to provide a gate arm having an anti-roll end cap that prevents the gate arm from rolling when it is detached from its gate operator.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
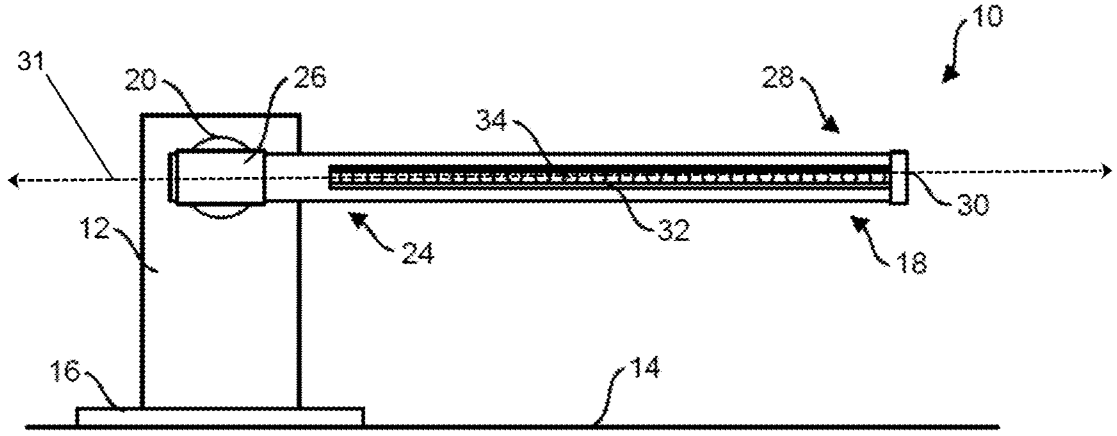
FIG. 1 a front plan view of a gate arm attached to a gate operator and having an anti-roll end caps at each end of the arm in accordance with principles of the invention.
Figure 2:
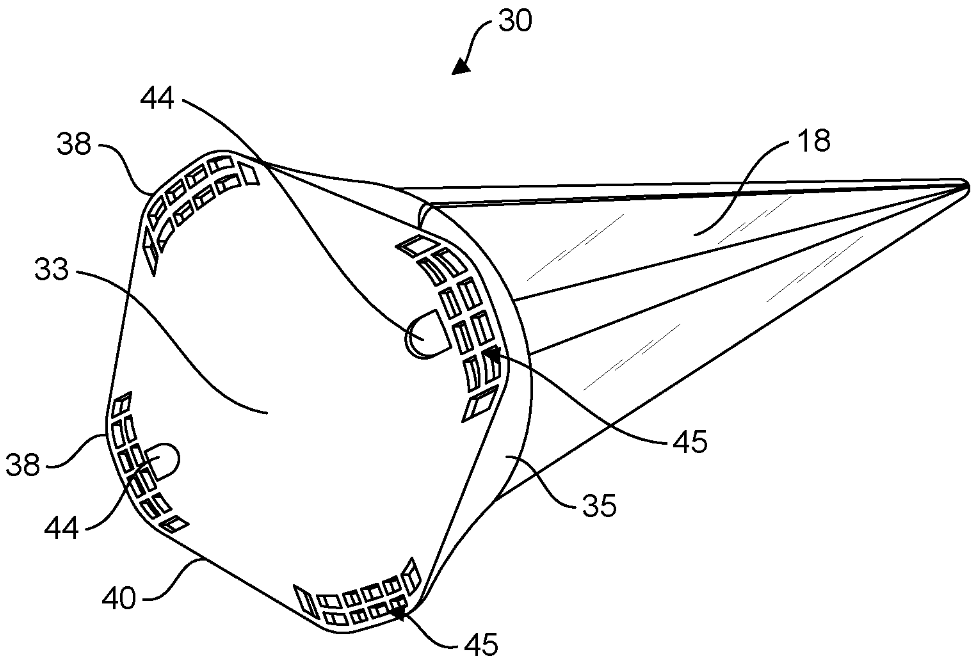
FIG. 2 is a perspective view of an anti-roll end cap for a gate arm in accordance with principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein. Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Unless otherwise indicated, all numbers expressing quantities of ingredients, dimensions, reaction conditions and so forth used in the specification and claims are to be understood as being modified in all instances by the term "about". The term "a" or "an" as used herein means "at least one" unless specified otherwise. In this specification and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

Various embodiments of the disclosure could also include permutations of the various elements recited in the claims as if each dependent claim was a multiple dependent claim incorporating the limitations of each of the preceding dependent claims as well as the independent claims. That is, the combinations of the various components of the invention are not limited to those combinations expressly shown in the Figures. Unless expressly stated otherwise, components described in one embodiment may be interchanged with components of the same name found in other embodiments. Such permutations are expressly within the scope of this disclosure.

Disclosed is a vehicle barrier gate arm having an anti-roll end cap. Typically, the end cap is attached to an elongate gate arm defined by an exterior wall, an elongate channel extending longitudinally along the length on the gate arm, and an LED light strip retained within the elongate channel. A gate operator is pivotally coupled to a proximal end of the gate arm. The gate operator has a control system, a power supply, and an actuator to selectively pivot the gate arm between a horizontal position and a vertical position. The end cap has a distal end and a proximal end and is attached to a distal end of the gate arm. The end cap has a distal outer panel and three or more protrusions positioned equidistantly along the periphery of the distal outer panel and extended outward perpendicular to the gate arm.

FIG. 1 shows a front plan view of a first embodiment of a vehicle barrier gate arm having an anti-roll end cap 10 in accordance with the principles of the invention. A gate operator 12 is affixed to a horizontal surface 14 at its base 16. The gate operator 12 contains a control system and an actuator for pivoting the gate arm 18, which defines a longitudinal direction 31. The gate operator 12 may have an internal or external power supply for powering the actuator and control system. In this embodiment, the horizontal surface 14 is the ground. A gate arm 18 is pivotally mounted to the gate operator by a pivoting bracket 20. The proximal region 24 of the gate arm 18 is inserted into a connection sleeve 26 of the bracket 20. The distal end 28 of the gate arm 18 has an anti-roll end cap 30 removably affixed. An LED light strip 34 is retained within an elongate channel 32 in the gate arm 18 and extends longitudinally along the length of the gate arm 18. The end cap 30 covers the end of the channel 32, preventing debris from entering the channel from the distal end.

FIGS. 2-7 show perspective, top, and bottom plan views of the anti-roll end cap 30 of FIG. 1, in accordance with the principles of the invention. In this embodiment, the end cap 30 has a substantially planar distal outer panel 33, and a cylindrical outer cuff 35 extending in a proximal direction. A smaller, inner cuff 36, shown in FIG. 5, also extends in a proximal direction and together form a friction fit with the gate arm 18, thereby holding the end cap 30 in place on the distal ends of the gate arm. The distal outer panel 33 includes four protrusions 38 extending outward perpendicular to the longitudinal axis 31 of the gate arm 18 and are equidistantly radially spaced about the periphery 40 of the distal outer panel 33.

Figure 3:
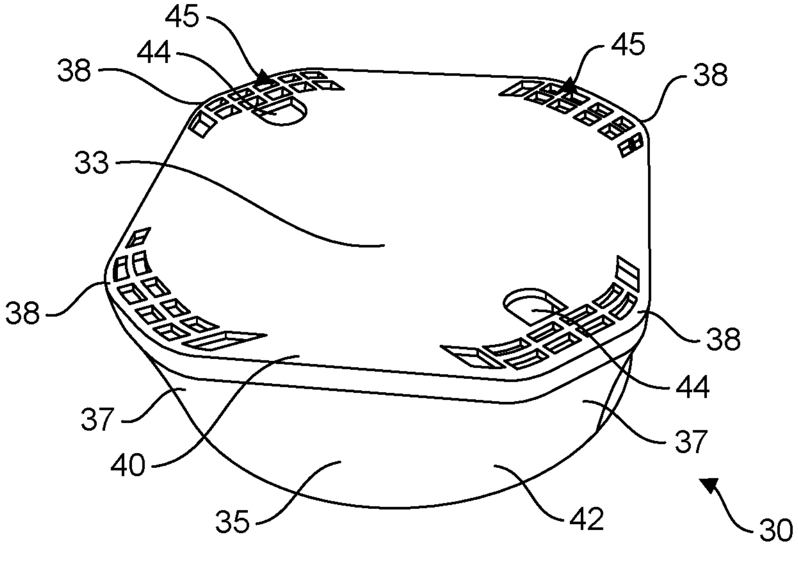
FIG. 3 is another perspective view of an anti-roll end cap for a gate arm in accordance with principles of the invention.
Figure 4:
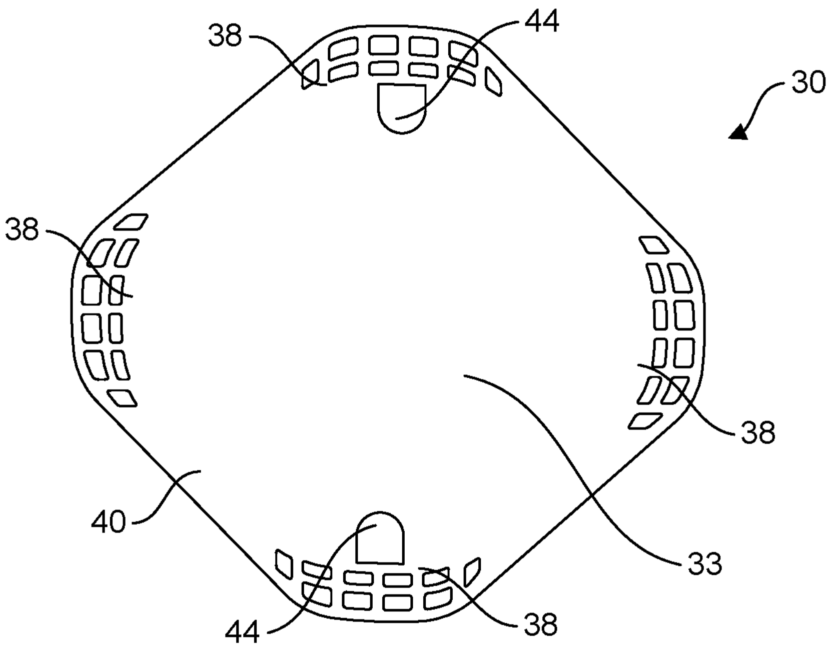
FIG. 4 is a top plan view of an anti-roll end cap for a gate arm in accordance with principles of the invention.
Figure 5:
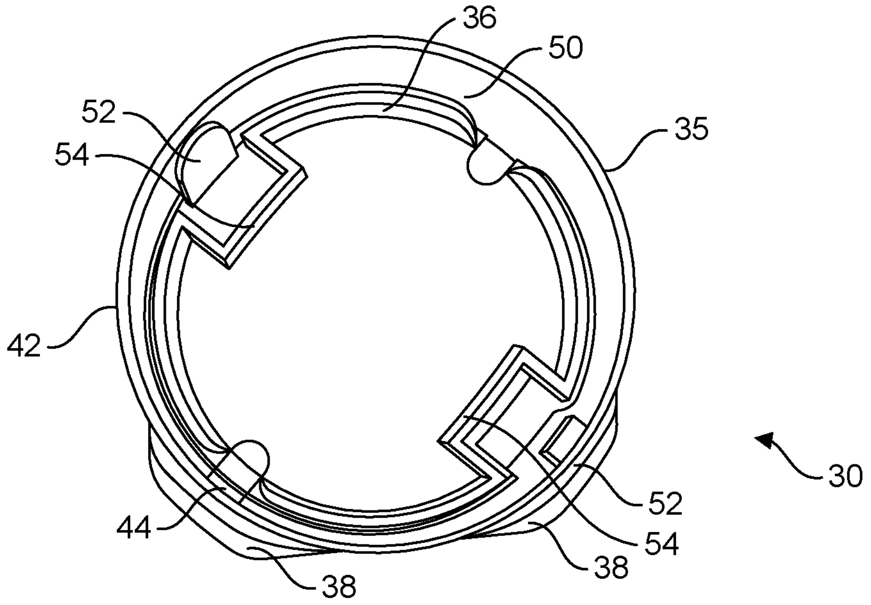
FIG. 5 is a bottom plan view of an anti-roll end cap for a gate arm in accordance with principles of the invention.
Figure 6:
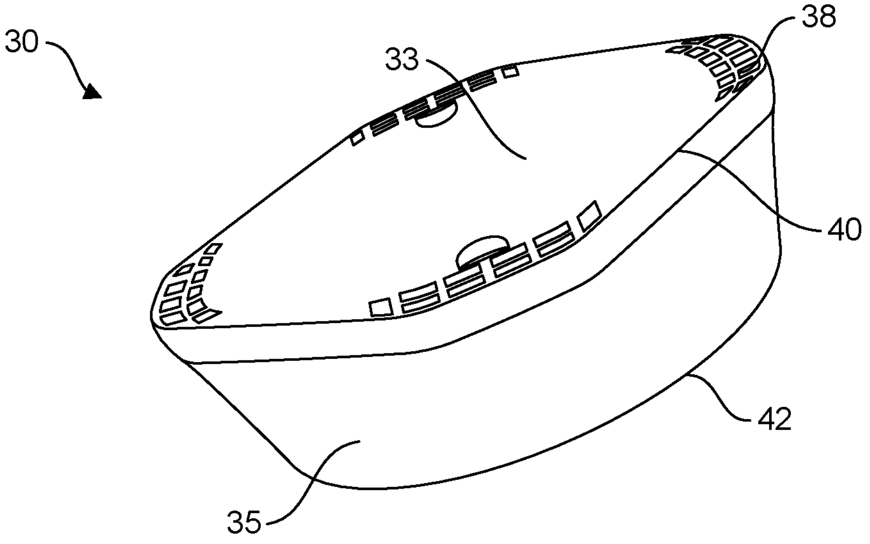
FIG. 6 is another perspective view of an anti-roll end cap for a gate arm in accordance with principles of the invention.
Figure 7:
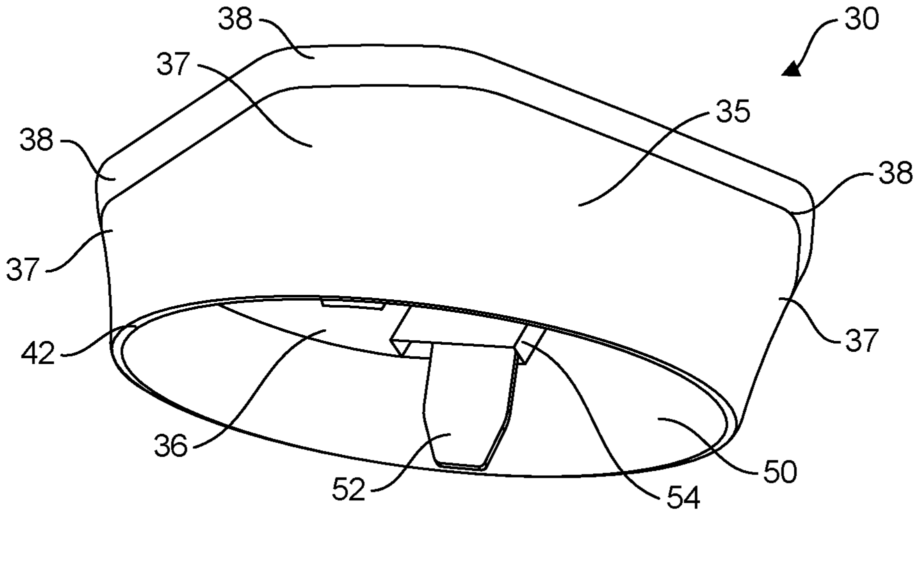
FIG. 7 is another perspective view of an anti-roll end cap for a gate arm in accordance with principles of the invention.

In this embodiment, the protrusions 38 do not extend proximally along the outer cuff 35. Instead, each of the protrusions 38 taper concavely inward in the proximal direction such that the proximal end 42 of the outer cuff 35 is circular, having the a consistent width at its proximal end 42. In this embodiment, the protrusions 38 are blunt and cause the distal outer panel 33 to have an approximately square shape with rounded corners. Furthermore, in this embodiment, the protrusions 38 have an internal honeycomb structure 45 exposed on the distal outer panel 33 and extending inward/proximally from the distal outer panel 33. This structure reduces the weight of, and the cost of manufacture of the end cap 30 while maintaining the protrusions' rigidity. The honeycomb structure also increases the flexibility of each protrusion 38, allowing it to absorb shock. Referring to FIG. 3, the outer cuff 35 includes a concavely curved region 37 extending longitudinally between each of the protrusions 38 to the proximal end 42 of the cuff 35, which has a uniform width.

The inside wall 50 of the outer cuff 35 includes two opposing tabs 52. In this embodiment, the two tabs 52 are aligned with rectangular indentations 54 in the inner cuff 36. The tabs 52 and indentations 54 align with the elongate channel 32 in the gate arm 18. The tabs 52 extend into the channels 32 when the end cap 30 is attached to the gate arm 18, and the rectangular indentations 54 engages with the inside walls of the channels 32. This prevents the end cap 30 from rotating relative to the gate arm 18, and prevents the end cap 30 from slowly rotating, and thus loosening, over time. The end cap 30 also includes two through holes 44 extending through the outer panel 33 and providing fluid communication between the interior of the gate arm 18 and the exterior surroundings. In this embodiment, the inner cuff 36 does not extend across the region where the through holes 44 are located. These through holes 44 prevent water, dirt, or other material from accumulating inside the gate arm 18. The two through holes 44 are approximately 90° from the tabs 52 and indentations 54, so that one of these through holes 44 will be located at the bottom of the gate arm 18 and the other through hole 44 at the top of the gate arm 18. As shown herein, the through holes 44 are substantially semi-circular. However, those having ordinary skill in the art would appreciate that any shape through hole 44 may be utilized. Optionally, the indentations 54 of the inner cuff 36 may include one or more through holes to allow a portion of an LED light strip within a channel to extend into the end cap itself, and provide illumination in a distal direction.

In use, if the gate arm 18 is impacted by a vehicle or another object and breaks loose, the protrusions 38 on the anti-roll end cap 30 inhibits the loose gate arm 18 from rolling away. If the gate arm 18 breaks loose and lands on soft material such as grass or sand, the protrusions 38 will become partially inserted into the ground, further preventing it from traveling a far distance from the gate operator 12. Due to the protrusions 38 location at the distal end of the end cap 30, and their lack of extension along the entire length of the cuff, they are more readily embedded in soft material. Thus, a gate arm 18 having an anti-roll end cap 30 will not incur further, irreparable damage, or cause further damage to other objects or pedestrians, once dislodged from the gate operator 12.

Figure 8:
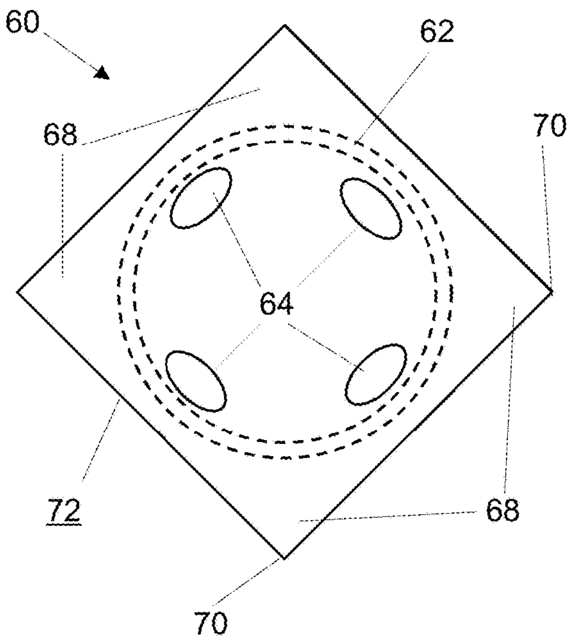
FIG. 8 is a top plan view of an alternative embodiment of an anti-roll end cap for a gate arm in accordance with principles of the invention.
Figure 9:
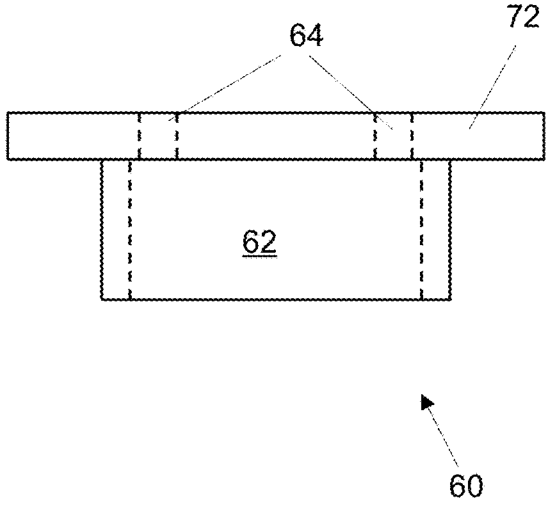
FIG. 9 is a side elevation view of an alternative embodiment of an anti-roll end cap for a gate arm in accordance with principles of the invention.

FIGS. 8 and 9 display a top plan view and a side elevation view of an alternative embodiment of an anti-roll end cap 60, in accordance with principles of the invention. In this embodiment, the anti-roll end cap 60 consists of an outer cuff 62 extending in a proximal direction, a distal outer panel 72, and four through holes 64 to allow drainage from a gate arm. The anti-roll end cap 60 can be removably attached to a gate arm by means of a friction fit between the outer cuff 62 and the distal end of the gate arm. Additionally, the anti-roll end cap 60 contains four protrusions 68 extending perpendicularly to the outer cuff 62 and equidistantly radially spaced about the outer cuff 62. As shown herein, the protrusions 68 do not taper inward in a proximal direction, but instead meet the outer cuff 62 at a right angle. Thus, the protrusions 68 have relatively sharp ends 70 and form a perfectly square shaped outer panel 72. Finally, the four through holes 64 are elliptical in shape and any liquid or other material that gathers inside the gate arm can drained through the through holes 64.

Figure 10:
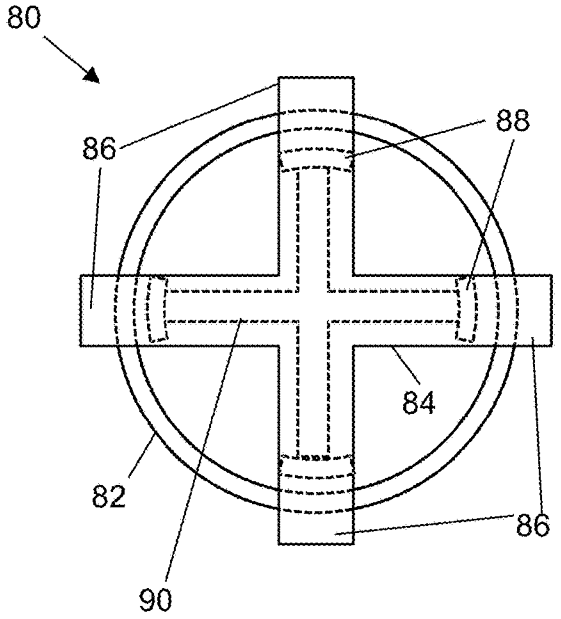
FIG. 10 is a top plan view of another alternative embodiment of an anti-roll end cap for a gate arm in accordance with principles of the invention.
Figure 11:
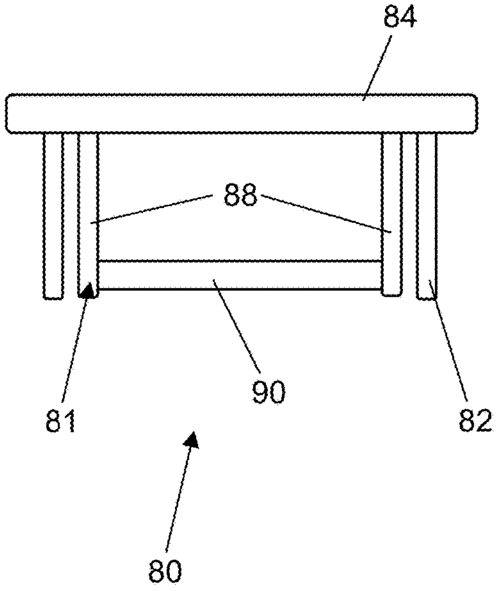
FIG. 11 is a side elevation view of another alternative embodiment of an anti-roll end cap for a gate arm in accordance with principles of the invention.

FIGS. 10 and 11 display a top plan view and a side elevation view of another alternative embodiment of an anti-roll end cap 80, in accordance with the principles of the invention. The anti-roll end cap 80 is formed from a cylindrical outer cuff 82 extending in a proximal direction and a cross shaped outer panel 84 having four protrusions 86. As used herein, the four curved tabs 88 are interconnected by a cross shaped support 90 to form an inner cuff 81. Thus, the inner cuff 81 is used along with the outer cuff 82 to form a friction fit with a gate arm to which anti-roll end cap 80 is attached.

Figure 12:
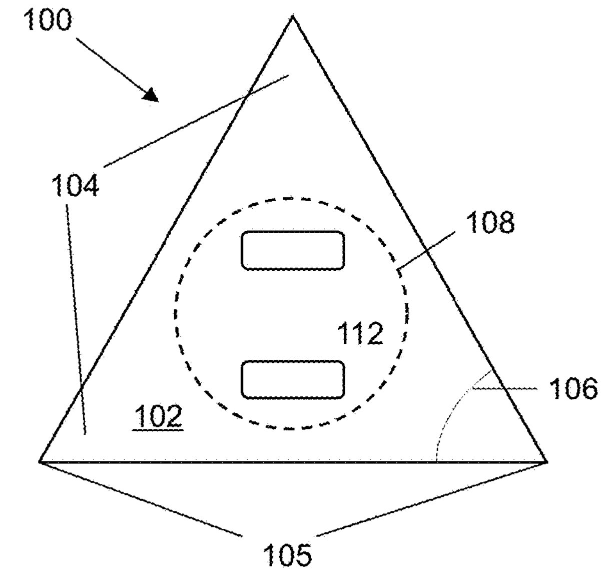
FIG. 12 is a top plan view of another alternative embodiment of an anti-roll end cap for a gate arm in accordance with principles of the invention.
Figure 13:
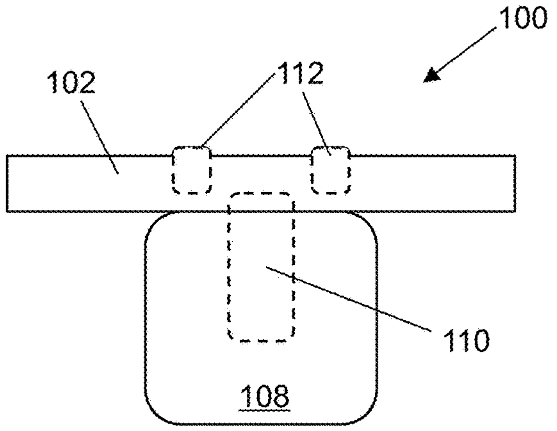
FIG. 13 is a side elevation view of another alternative embodiment of an anti-roll end cap for a gate arm in accordance with principles of the invention.

FIGS. 12 and 13 display a top plan view and a side elevation view of another alternative embodiment of an anti-roll end cap 100, in accordance with principles of the invention. In this embodiment, a triangular outer panel 102 forms three protrusions 104. As shown in this embodiment, the protrusions 104 meet at a sixty degree angle 106 and form sharp corners 105. However, those having ordinary skill in the art would appreciate that the protrusions 104 may taper in a proximal direction and may be blunt or rounded, as in other embodiments. The anti-roll end cap 100 has a compressible foam cylinder 108 configured to extend into and provide a friction fit with the distal end of the gate arm. In this embodiment, the anti-roll end cap 100 is composed of a durable and transparent material, such as transparent thermoplastic polymer, transparent PVC, acrylic, or the like. The anti-roll end cap 100 further includes two LED lights 112. The LED lights 112 can be programmed to be solid when the gate arm is fully engaged in the connection sleeve of the gate operator, and to blink when the gate arm has become detached. Furthermore, the anti-roll end cap 100 includes an internal microcontroller 110 having a wireless transmitter that sends an alert signal when the gate arm has become detached from the connection sleeve of the gate operator.

Figure 14:
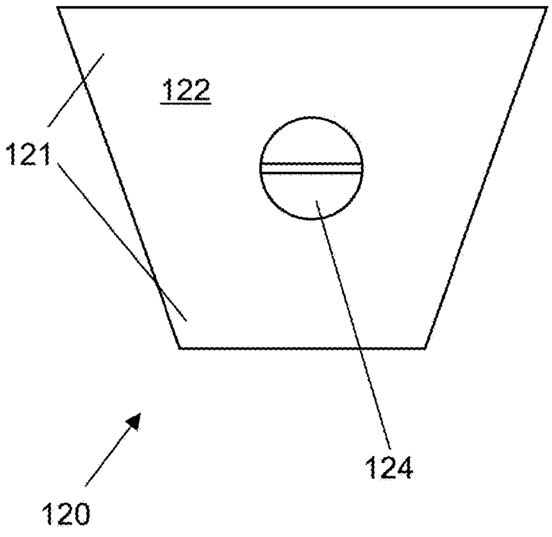
FIG. 14 is a top plan view of another alternative embodiment of an anti-roll end cap for a gate arm in accordance with principles of the invention.
Figure 15:
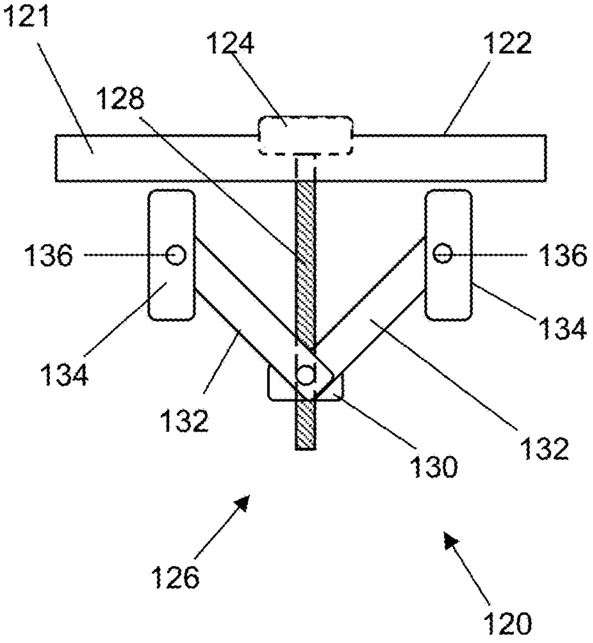
FIG. 15 is a side elevation view of another alternative embodiment of an anti-roll end cap for a gate arm in accordance with principles of the invention.

FIGS. 14 and 15 display a top plan view and a side elevation view of another alternative embodiment of an anti-roll end cap 120, in accordance with principles of the invention. Anti-roll end cap 120 has an outer panel 122. The outer panel 122 has a trapezoidal shape, formed by four protrusions 121. Those skilled in the art will appreciate that the outer panel of an anti-roll end cap need not be radially symmetric. Moreover, the trapezoidal shape may more effectively stop the rolling of a gate arm that has been released. The anti-roll end cap 120 also attaches to a gate arm in a manner different from the previous embodiments. The head 124 of a screw 126 is positioned in the center of the outer panel 122. The stem 128 of the screw 126 extends proximally and is engaged with a biased toggle bolt 130. As shown in this embodiment, each wing 132 of the toggle bolt 130 has a grip pad 134 secured on the distal end of each wing 136.

To attach the anti-roll end cap 120 to the distal end of a gate arm, the toggle bolt 130 is placed inside the gate arm and the outer panel 122 is placed flush against the distal end of the gate arm. The screw 126 is then twisted, causing the wings 132 to extend outward and the grip pads 134 to impinge upon the inside wall of the gate arm. The screw 126 is tightened to firmly secure the anti-roll end cap 120 to the distal end of the gate arm. Those skilled in the art will appreciate that this configuration allows an anti-roll end cap to be attached to almost any gate arm regardless of shape or diameter.

Figure 16:
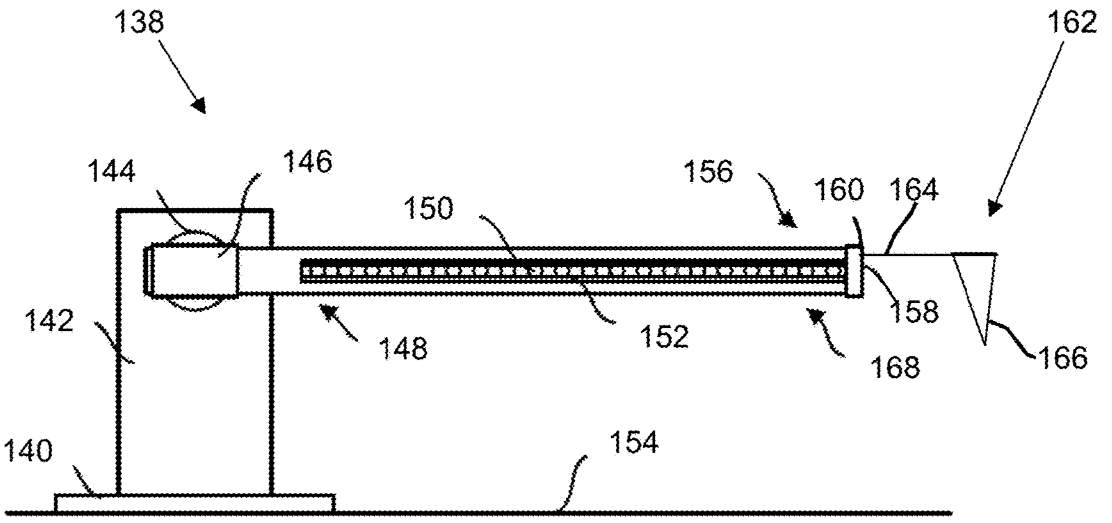
FIG. 16 a front plan view of a gate arm attached to a gate operator and having an anti-roll end caps at each end of the arm in accordance with principles of the invention.

FIG. 16 shows a front plan view of an alternative embodiment of a vehicle barrier gate arm having an anti-roll end cap 138, in accordance with the principles of the invention. A gate operator 142 is affixed to a horizontal surface 154 at its base 140. The gate operator 142 contains a control system and an actuator for pivoting the gate arm 168. The gate operator 142 may have an internal or external power supply for powering the actuator and control system. In this embodiment, the horizontal surface 154 is the ground. A gate arm 168 is pivotally mounted to the gate operator by a pivoting bracket 144. The proximal region 148 of the gate arm 168 is inserted into a connection sleeve 146 of the bracket 144. The distal end of the gate arm 156 has an anti-roll end cap 158 removably affixed. An LED light strip 150 is retained within an elongate channel 152 in the gate arm 168 and extends longitudinally along the length of the gate arm 168. In this embodiment, the anti-roll end cap 158 is composed of a florescent material, such as a florescent plastic or acrylic. Those skilled in the art will appreciate that any of the end caps disclosed herein may optionally be formed wholly or partially from florescent, phosphorescent or other illuminating materials. This embodiment also and contains a flag 162 mounted to the top side of the anti-roll end cap 160. The flag 162 consists of a mast 164 and a flexible triangular banner 166. The mast 164 may be rigid or flexible. A flexible mast is less likely to break. The banner 166 may also optionally be rectangular or of another configuration.

The flag 162 may be extend distally as shown here, or may optionally be mounted on the top side of the anti-roll end cap 160. The flag 162 may flutter in the wind and/or when the barrier arm 168 translates between horizontal and vertical positions. When the flag is mounted on the top side of the cap 160, it may further prevent rolling of the arm when it becomes dislodged from its bracket. The pivoting of the barrier arm 168 causes the flexible triangular banner 166 of the flag 162 to flutter in the wind and draw attention to the distal end of the gate arm 148. Furthermore, when the anti-roll end cap is composed of fluorescent material, it will glow in the dark, drawing additional attention to the distal end of the gate arm 148. These safety precautions will hopefully reduce the number of collisions that occur between the gate arm 168 and a vehicle, at all hours of operation.

Figure 17:
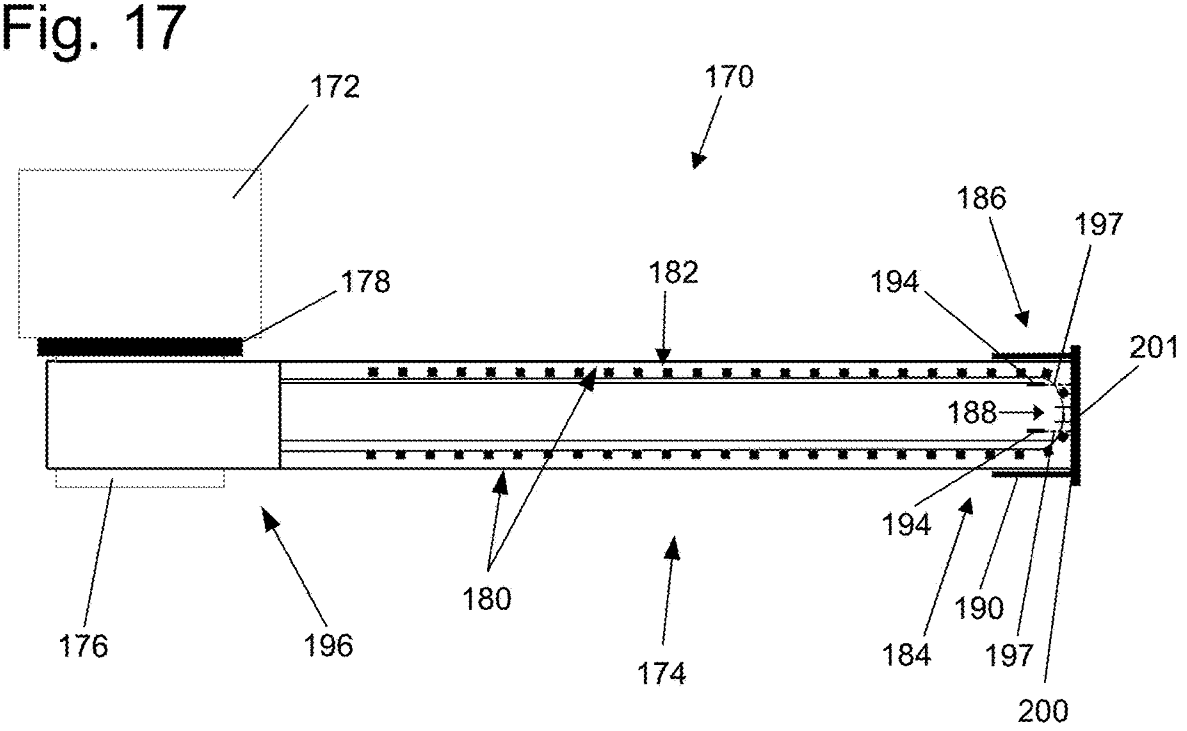
FIG. 17 a top cross-sectional view of a gate arm having an anti-roll end cap in accordance with principles of the invention.

FIG. 17 shows a top cross-sectional view of an alternative embodiment of a vehicle barrier gate arm having an anti-roll end cap 170, in accordance with the principles of the invention. As shown in this embodiment, the gate arm 174 is pivotally mounted to a gate operator 142 by a pivoting bracket 178, and the proximal end 196 of the gate arm 174 is inserted into the connection sleeve 176 of the bracket 178. The distal end of the gate arm 184 has an anti-roll end cap 186 secured by a friction fit between the outer cuff 190 and inner cuff 194 of the anti-roll end cap 186. The gate arm contains two elongate longitudinal channels 180 on each side of the gate arm 168 that extend the length of the gate arm 168. An LED light strip 182 is retained within the elongate channels 180 of the gate arm 174 and a distal portion of the LED light strip 198 can be added to further extend through in the anti-roll end cap 186, through openings 197 in the inner cuff 194. The distal portion of the LED light strip 198 is secured into the anti-roll end cap 186 by a clip 188 affixed to the back side 200 of the distal outer panel 201. Furthermore, as used herein, the anti-roll end cap 186 is composed of a durable and transparent material, such as transparent thermoplastic polymer, transparent PVC, acrylic, or the like. Thus, the distal portion of the LED light strip 198 is used to illuminate the anti-roll end cap 186 to provide a further safety measure.

Figure 18:
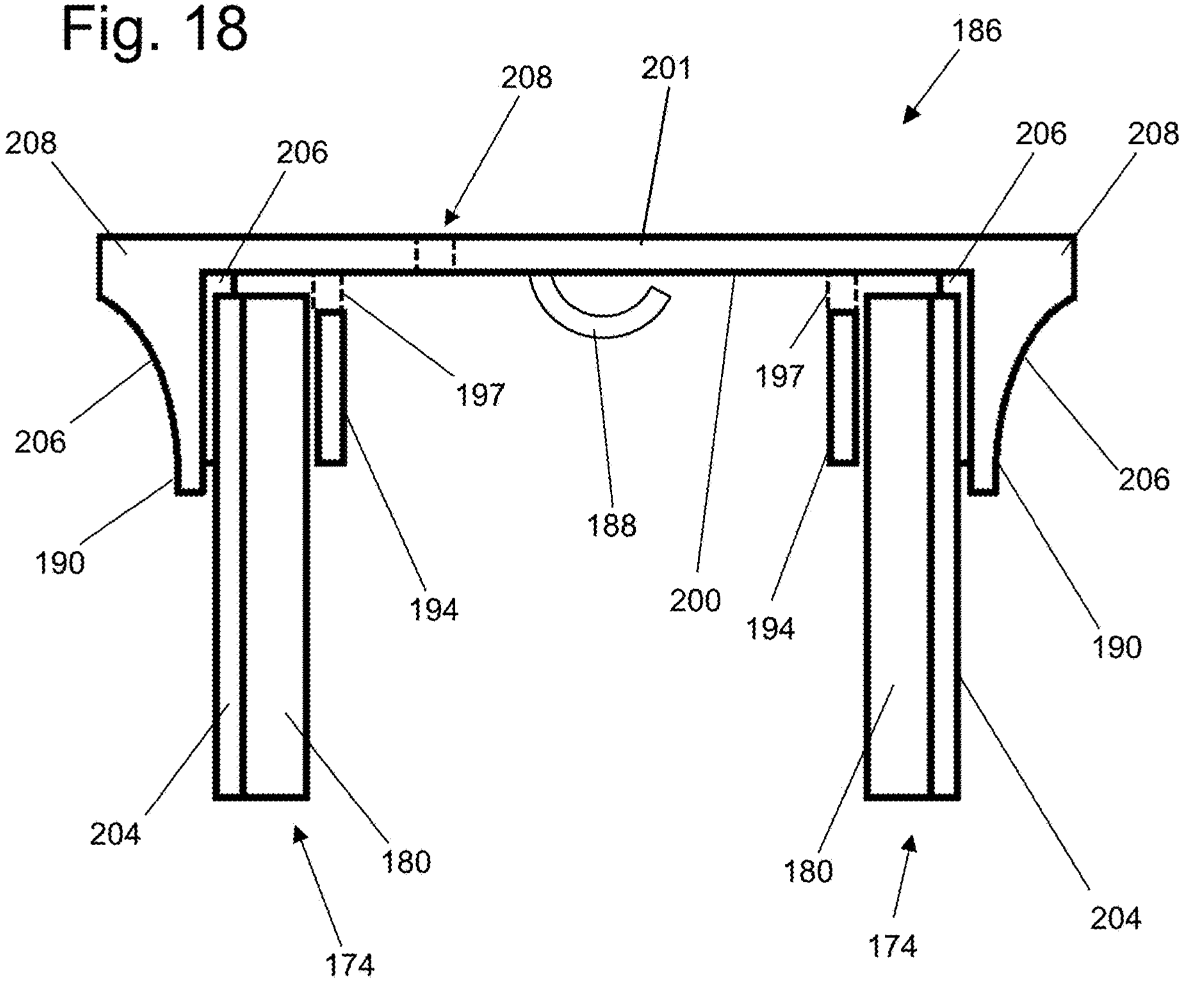
FIG. 18 is a cross-sectional view of an end cap having through holes in its inner cuff in accordance with the principles of the invention.

FIG. 18 shows an enlarged cross-section of the end cap 186 in accordance with the principles of the invention. The outer panel 201 includes two protrusions 208. The outer cuff 190 has a concavely tapered region 206 extending from the protrusion 208 to its proximal end 190. The outer cuff abuts the outer wall 204 of the gate arm 174. The indented region of the inner cuff 194 buts the channel 180 and the tab 206 extending along the inside of the outer cuff also aligns with and slides into the channel 180. The inner cuff 194 includes a through hole 197 that allows an LED light strip to extend out of the end of the channel, through the clip 188 and down the channel on the opposite side of the gate arm. The end cap 186 also includes at least one through hole 208 that allows debris and/or water to exit the inside of the gate arm 174.

The anti-roll end cap itself is made of durable material that may be transparent, opaque, or fluorescent. Additionally, the distal outer panel of the end cap is to be formed by three or more protrusions extending perpendicularly to the gate arm. These protrusions may also form a number of shapes and should include, but should not be limited to, what is shown in the drawings. Those having ordinary skill in the art would appreciate the anti-roll end cap may have as little or as many protrusions and may form as many designs as one may desire, so long as the design intent of the anti-roll end cap for a vehicle barrier arm is met. Furthermore, the three or more protrusions may taper inward to form blunt or rounded ends, may meet at sharp corners, or may utilize a combination of the two, to form the distal outer panel.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A vehicle barrier gate arm having an anti-roll end cap comprising;

a gate arm defined by an exterior wall and an elongate channel extending longitudinally along a length on the gate arm, wherein an LED light strip is retained within the elongate channel;

a gate operator pivotally coupled to a proximal end of the gate arm, wherein the gate operator comprises: a control system, a power supply, and an actuator to selectively pivot the gate arm between a horizontal position and a vertical position;

and the anti-roll end cap having a distal end and a proximal end, attached to a distal end of the gate arm, wherein the end cap comprises;

a distal outer panel;

and three or more protrusions extending outward from a periphery of the distal outer panel, wherein the three or more protrusions are positioned radially equidistantly along the periphery of the distal outer panel and are substantially perpendicular to the gate arm.

2. The end cap of claim 1, wherein the end cap comprises a cylindrical outer cuff extending in a proximal direction.

3. The end cap of claim 2, wherein the end cap comprises an inner cuff extending in a proximal direction.

4. The end cap of claim 3, wherein an inside wall of the cylindrical outer cuff contains two tabs tapering in the proximal direction aligned with two rectangular indentations on the inner cuff; and wherein the tabs and indentations align with the elongate channel in the gate arm.

5. The end cap of claim 4, wherein the end cap is removably attached to the gate arm by a friction fit between the gate arm and the cylindrical outer cuff and the inner cuff.

6. The end cap of claim 5, wherein the end cap contains two through holes extending through the distal outer panel and located 90° from the tabs and rectangular indentations.

7. The end cap of claim 6, wherein the end cap comprises four protrusions and the distal outer panel is substantially square.

8. The end cap of claim 7, wherein the four protrusions have rounded ends and taper inward in a proximal direction toward a proximal end of the cylindrical outer cuff.

9. The end cap of claim 7, wherein the four protrusions have sharp ends and meet the cylindrical outer cuff at a right angle.

10. The end cap of claim 8, wherein the three or more protrusions have an internal honeycomb structure.

11. The end cap of claim 10, wherein the end cap is composed of florescent material.

12. The end cap of claim 10, wherein the end cap is composed of transparent material.

13. The end cap of claim 12, wherein the end cap contains an LED light.

14. The end cap of claim 13, wherein the LED light is a distal portion of an LED strip retained within the elongate channel is routed through a clip in the end cap.

15. The end cap of claim 10, wherein the end cap contains a flag.

16. The end cap of claim 6, wherein the end cap comprises three protrusions and the distal outer panel is substantially triangular.

17. The end cap of claim 6, wherein the end cap comprises four protrusions and the distal outer panel is substantially cross-shaped.

18. The end cap of claim 6, wherein the end cap comprises four protrusions and the distal outer panel is substantially trapezoidal.

19. The end cap of claim 1, wherein the end cap comprises a cylindrical foam cylinder extending in a proximal direction; and wherein the foam cylinder is configured to extend into and provide a friction fit into the distal end of the gate arm.

20. The end cap of claim 1, wherein the end cap comprises a screw positioned in a center of the outer panel which extends in a proximal direction and is engaged with a biased toggle bolt with two or more wings and a brake pad on each wing; and wherein when the screw is twisted the two or more wings extend and the brake pads impinge on an inner wall of the distal end of the gate arm.

* * * * *